United States Patent
Li

(10) Patent No.: US 6,666,228 B1
(45) Date of Patent: Dec. 23, 2003

(54) BALL COCK ASSEMBLY

(76) Inventor: Feiyu Li, First floor, #43, Huli Main Road, Xiamen, P.R. (CN), 361006

( * ) Notice: Subject to any disclaimer, the term of this patent is extended or adjusted under 35 U.S.C. 154(b) by 0 days.

(21) Appl. No.: 10/461,554

(22) Filed: Jun. 12, 2003

(51) Int. Cl.[7] .......................... F16K 31/26; F16K 33/00
(52) U.S. Cl. ...................... 137/426; 73/322.5; 137/432; 137/444
(58) Field of Search .................. 73/322.5; 137/414, 137/426, 430, 432, 441, 443, 444

(56) References Cited

U.S. PATENT DOCUMENTS

| | | | |
|---|---|---|---|
| 4,100,928 A | | 7/1978 | Schoepe |
| 4,108,202 A | | 8/1978 | Schoepe |
| 4,182,364 A | | 1/1980 | Gilbert et al. |
| 4,428,208 A | * | 1/1984 | Krause ..................... 137/426 |
| 4,453,560 A | * | 6/1984 | Nestich et al. ............. 137/426 |
| 4,600,031 A | * | 7/1986 | Nestich ..................... 137/426 |
| D292,120 S | * | 9/1987 | Nestich ..................... D23/19 |
| 4,714,088 A | * | 12/1987 | Ivins ......................... 137/426 |
| 5,255,703 A | * | 10/1993 | Johnson ..................... 137/426 |
| 5,738,141 A | * | 4/1998 | Blanke et al. ............. 137/426 |
| 5,904,176 A | | 5/1999 | Li |
| 5,975,125 A | * | 11/1999 | Nichols-Roy ............... 137/426 |
| 6,155,288 A | * | 12/2000 | Johnson ..................... 137/426 |
| 6,510,866 B2 | | 1/2003 | Li |

* cited by examiner

*Primary Examiner*—George L. Walton
(74) *Attorney, Agent, or Firm*—Walter A. Hackler

(57) ABSTRACT

A ball cock assembly includes a water supply riser with a valve for controlling water flow into a toilet tank. The valve includes an arm extending therefrom for opening and closing the valve. A float container is provided and disposed adjacent to the riser for movement therealong and a float is disposed in the float container for rising within the float container upon water flow into the float container. An actuator is disposed in an operative relationship with the float, float container and valve arm for operating the valve. The actuator includes an outer member attached to the float for moving the valve arm and an inner member for adjusting a level of the float container along the riser independent of movement of the valve arm by the outer member.

18 Claims, 2 Drawing Sheets

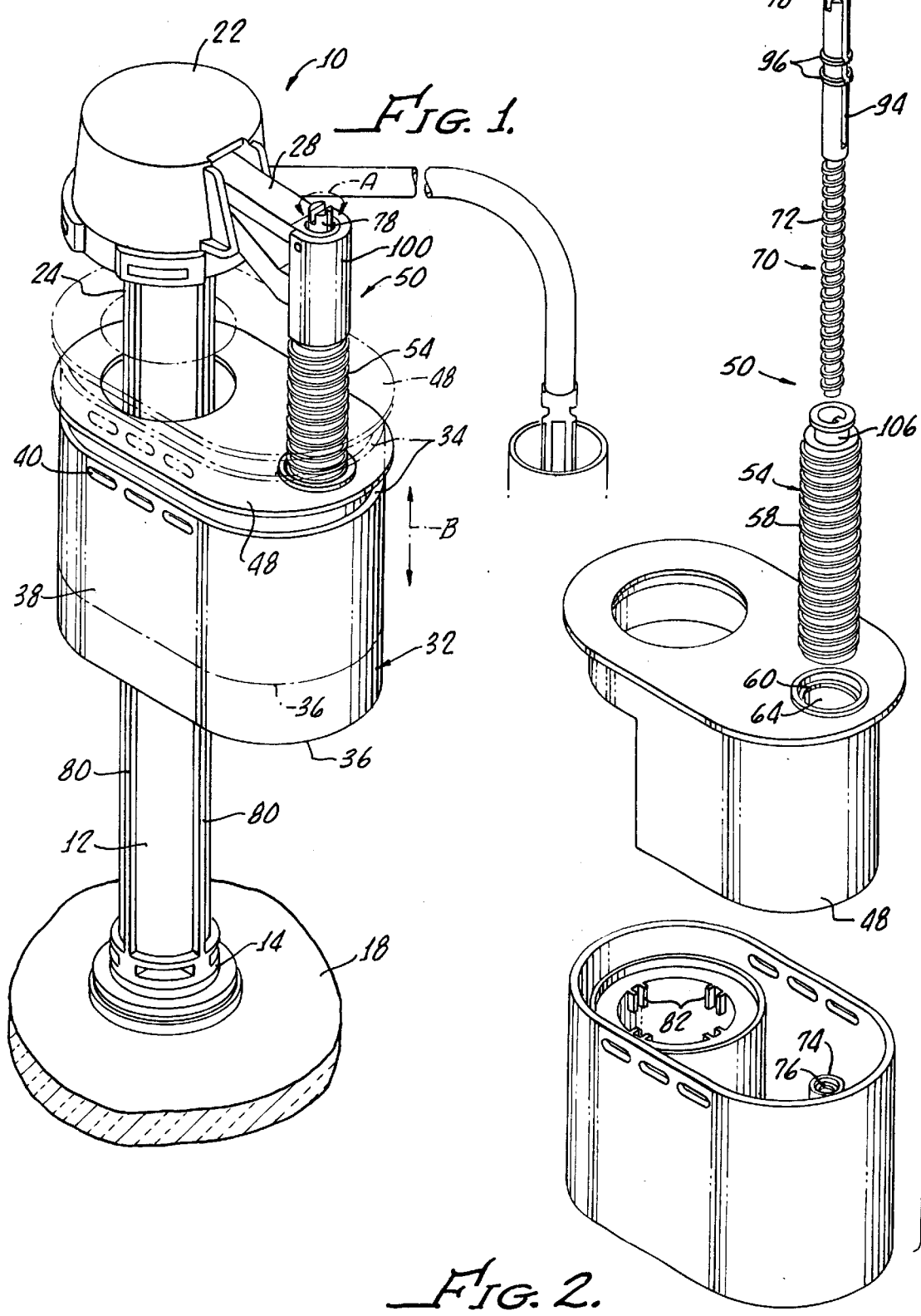

FIG. 3.
FIG. 4.
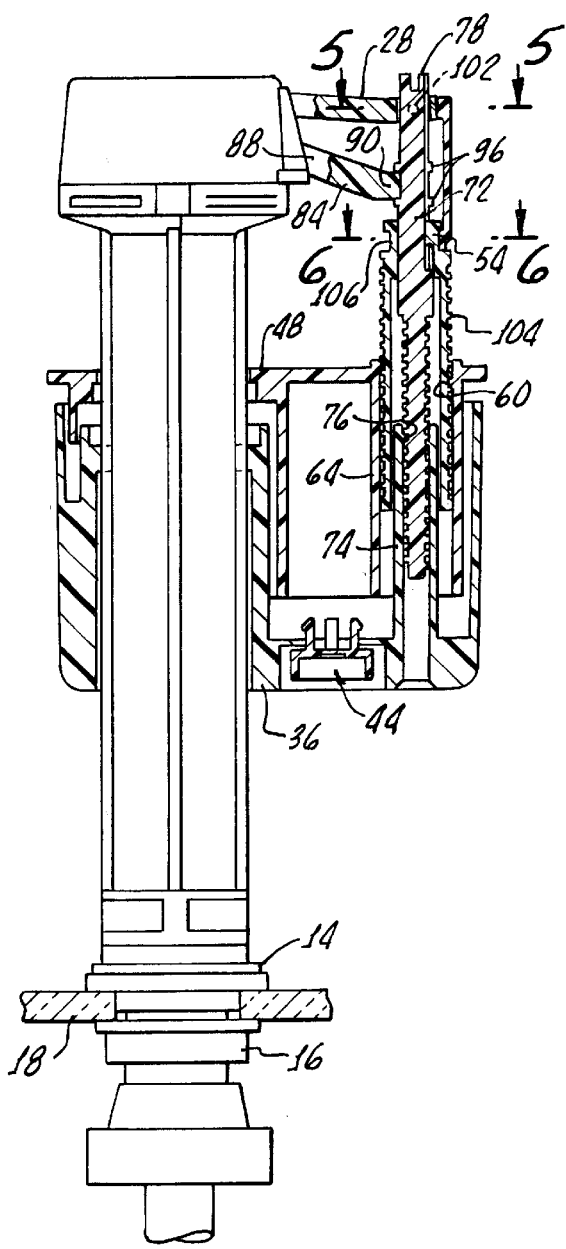
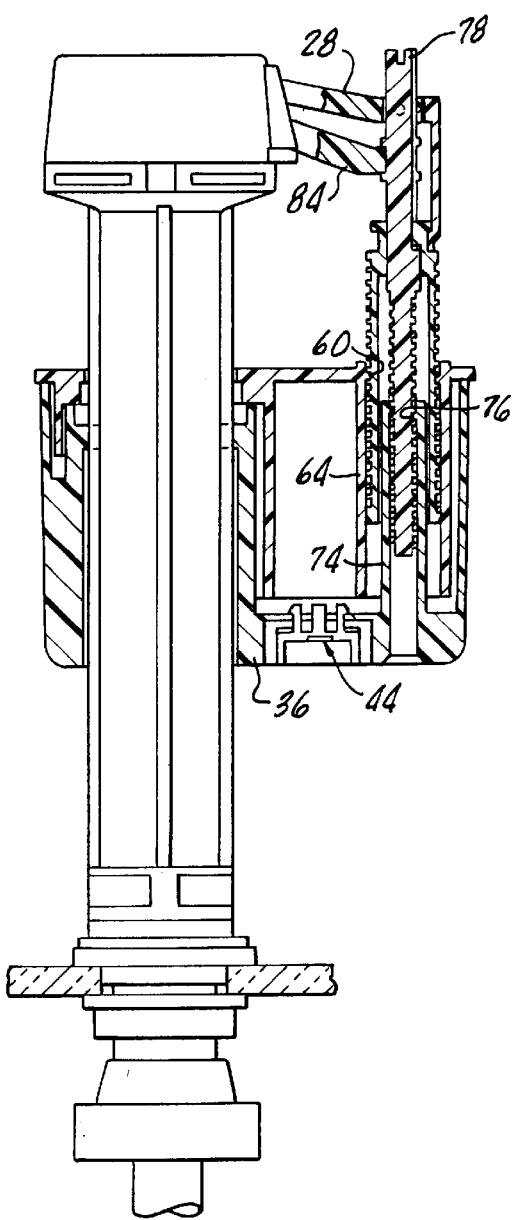
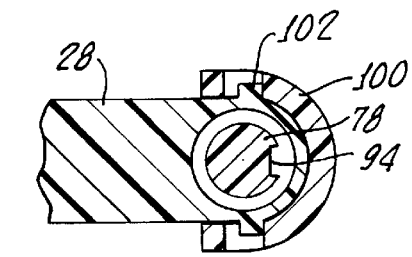
FIG. 5.
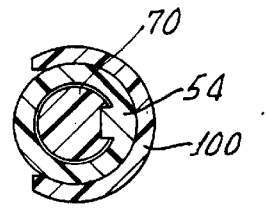
FIG. 6.

BALL COCK ASSEMBLY

The present invention generally relates to ball cock assemblies and is more particularly directed to a ball cock assembly having an improved float for controlling the water level in a toilet flush tank.

Various prior art float control ball cocks have heretofore been developed for controlling the flow into and the level of water within a toilet tank.

Typically, a float interconnected with a ball cock valve is raised and lowered by water within the tank which controls the opening and closing of the ball cock valve in order to maintain a storage water level within the tank.

In operation, a flush valve is operated to drain water from the tank into the toilet bowl and the ball cock assembly regulates refilling of the tank with water and maintaining the level of water therein ready for the next flushing action.

A particularly advantageous ball cock assembly is set forth in U.S. Pat. No. 6,510,866 B2 to Li which utilizes a float container adjustably attached to a riser for supporting a float interconnected with an operating arm of a ball cock valve. This apparatus provides for more positive and abrupt operation of the ball cock valve and of this patent, namely U.S. Pat. No. 6,510,866 B2, is incorporated herewith by this specific reference thereto in its entirety for the purpose of describing the operation of this type of ball cock assembly.

The ball cock assembly as set forth in the referenced patent includes an awkward structure for adjusting the desired water level within the tank which is dictated by the positioning of the float container along the riser. This must be manually performed by reaching into the tank and adjusting the riser which is adjustably attached to the riser.

The present invention provides for an improvement to this ball cock assembly structure which enables the adjustment of the float container along the riser by simply rotating a conveniently placed screw head which can be operated by the installer or user of the tank without reaching into the toilet tank itself.

SUMMARY OF THE INVENTION

A ball cock assembly in accordance with the present invention generally includes a water supply riser having a bottom fitting for attachment to a water inlet to a water tank. A valve, disposed at a top of the riser, is provided for controlling water flow into the tank. The valve includes an arm extending therefrom for opening and closing the valve and the water flow preferably passes through the riser.

A float container is provided and disposed adjacent to the riser for movement therealong.

Preferably, the float container is slidably disposed on the riser with the float container including a top, a bottom and interconnecting sidewalls. The bottom may include a one-way valve disposed therein for preventing water entry into the float container through the float container bottom and the sidewalls preferably have openings therein, proximate the top, for enabling water flow into the float container. This operation is detailed in U.S. Pat. No. 6,510,866 B2, and, as hereinabove noted, incorporated herein.

A float is disposed in the float container for rising within the float container upon water flow into the float container.

An actuator, interconnecting the float, float container, and the valve arm, is provided for operating the valve with the actuator having an outer member attached to the float for moving the valve arm and a inner member for slidably adjusting a level of the float container along the riser independent of movement of the valve arm by the outer member.

More particularly, the inner member threadably engages the float container and the outer member threadably engages the float.

Preferably, the actuator further includes a stabilizer having one end fixed to the riser proximate a top thereof and another end engaging in an upper portion of the inner member. The inner member, in turn, includes a shoulder for engaging the another end of the stabilizer and enabling rotation of the inner member.

In order that the actuator enable movement of the float container along the riser without effecting the inner member operational relationship with the arm, the threaded engagement between the inner member and the float container and the threaded engagement between the outer member and the float are of the same pitch. This enables turning of the inner member to raise and lower the float container relative to the riser while the outer member remains fixed with respect to the riser and the valve arm. Thus, the outer member can operate, or move, the valve arm in a manner dependent upon the float position within the float container despite the position of the float container with respect to the riser.

Preferably, the inner member top portion extends through the valve arm and the inner member top portion further includes a slotted head for enabling manual rotation of the inner member.

In addition, the outer member includes an upper semi-sleeve having a top pivotally attached to the arm and a bottom coupled to the bottom portion of the outer member for enabling rotation of the outer member bottom portion without rotation of the semi-sleeve.

BRIEF DESCRIPTION OF THE DRAWINGS

The present invention may be more clearly understood with reference to the following detailed description in conjunction with the appended drawings of which:

FIG. 1 is a perspective view of a ball cock assembly in accordance with the present invention generally showing a water supply riser, a valve disposed at a top of the riser, a float container disposed adjacent to the riser for movement therealong as indicated in phantom line, a float disposed in the float container and an actuator disposed in an operative relationship with the float, float container and valve;

FIG. 2 is a perspective exploded view of the float container, float and actuator shown in FIG. 1;

FIG. 3 is a side view, in partial cross section, illustrating the floatation of the float within the float container which causes an outer member of the actuator to operate the valve through an arm;

FIG. 4 is a view similar to that shown in FIG. 3 with water drained from the float container through a bottom valve with the float in a non-buoyant position within the float container, thus operating the valve through the arm and outer member of the actuator to open the valve for admitting water into a toilet tank, not shown;

FIG. 5 is a cross sectional view along 5—5 of FIG. 3 illustrating the arrangement of the actuator outer member, inner member and valve arm; and FIG. 6 is a cross sectional view taken along the line 6—6 of FIG. 3 illustrating an upper semi-sleeve of the outer member.

DETAILED DESCRIPTION

With reference to FIGS. 1–4, there is shown a ball cock assembly 10 in accordance with the present invention generally including a water supply riser 12 having a bottom fitting 14 for attachment to a water inlet 16 (See FIG. 2) to a toilet tank bottom 18, see FIGS. 3 and 4.

A valve 22 is disposed at a top 24 of the riser for controlling water flow into the tank (not shown) with the valve having an operating arm 28 extending therefrom. The valve 20 may be of any suitable construction, such as, for example, that shown in U.S. Pat. No. 5,904,176 to Li. This patent is to be incorporated herewith in its entirety by this specific reference thereto for describing the valve 22 suitable for use in the present invention.

A float container 32 is disposed adjacent to the riser 12 for movement therealong. Specifically, the float container 32 is not attached or movably fixed to the riser 12 but rather is slidably disposed on the riser 12. Phantom lines in FIG. 1 indicate adjustment of the float container 32 along the riser 12 as will be hereinafter discussed in greater detail.

The float container 32 includes a top 34, a bottom 36 and interconnecting sidewalls 38. The sidewalls include openings 40 proximate the container top 3 for enabling water flow into the float container 32.

As more clearly shown in FIGS. 3 and 4, the float container 32 includes a one-way valve 44 disposed in the container bottom 36 for preventing water entry into the float container 32 through the float container bottom 36. Operation of the one-way valve 44 and the filling of the float container 32 via the openings 44 for buoyantly raising a float 48 and the advantages thereof are described in U.S. Pat. No. 6,510,866 B2 incorporated herewith by specific reference thereto.

An actuator 50 interconnects the float 48, float container 32, and valve arm 28 The actuator 50 includes an outer member 54 preferably attached to the float 48 by threads 58, 60 disposed respectively on the outer member 54 and in a float top 64, see FIGS. 3 and 4. It should be appreciated that all of the elements of the assembly 10 may be formed from conventional materials, such as plastic or the like.

The actuator 50 further includes an inner member 70 including threads 72 for engaging an upstanding chamber 74 with threads 76. Rotation of the inner member via a slotted head 78 (as indicated by the arrow A) adjusts a level (as indicated by the arrow B) of the float container 32 along the riser 12 (as indicated by phantom lines in FIG. 1) independent of movement of the valve arm 28 by the outer member 54. Rotation of the container 32 around the riser 12 is prevented by ridges 80 longitudinally disposed along the riser 12 and engaging grooves 2 in the float container 32 which surrounds the riser 12.

Importantly, the threads sots 58, 60 and 72, 76 are of the same pitch, which enables turning of the inner member 70 to raise and lower the float container 32 and float 48 together relative to the riser 2 This fixed relationship is established by a stabilizer 84 having a one end 88 thereof fixed to the riser 12 proximate the top 24 thereof and another end 90 engaging an upper portion 94 of the inner member 70. Shoulders 96 enable engagement with the end 90 of the stabilizer 84 while allowing rotation of the inner member 72.

With reference to FIGS. 1, 2, 5, and 6 the outer member 54 includes an upper semi-sleeve 100 which is pivotally 102 attached to the arm 28 and attached to a bottom portion 104 of the outer member 54 through a coupling 106 for enabling rotation of the outer member bottom portion 104 without rotation of the semi-sleeve 100.

Although there has been hereinabove described a specific ball cock in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclose herein. Accordingly, any and all modifications, variations or equivalent arrangements which may occur to those skilled in the art, should be considered to be within the scope of the present invention as defined in the appended claims.

What is claimed is:

1. A ball cock assembly comprising:
   a water supply riser having a bottom fitting for attachment to a water inlet to toilet tank;
   a valve disposed at a top of the riser for controlling water flow into the tank, said valve having an arm extending therefrom;
   a float container slidably disposed on the riser, said float container including a top, a bottom and interconnecting side walls, said bottom having a one way valve disposed therein for preventing water entry into said float container through the float container bottom, said side walls having openings therein, proximate said top, for enabling water flow into said float container;
   a float, disposed in said float container, for rising within said float container upon water flow into said float container;
   an actuator interconnecting said float, float container and valve arm for operating the valve, said actuator having an outer member attached to said float for moving the valve arm and an inner member extending through an opening within said float and into an opening within said float container, with an adjustment member for operably securing said float and said float container together for slidably adjusting a level of said float container and said float along the riser independent of movement of the valve arm by si ad outer member.

2. The ball cock assembly according to claim 1 wherein said inner member threadably en ages said float container.

3. The ball cock assembly according to claim 2 wherein said outer member threadably engages said float.

4. The ball cock assembly according to claim 3 wherein said actuator further comprises a stabilizer having one end fixed to the riser proximate a top thereof and another end engaging an upper portion of said inner member, and said inner member comprises a shoulder for engage the another end of said stabilizer and enabling rotation of said inner member.

5. The ball cock assembly according to claim 4 wherein the thread engagement between said inner member and said float container and the thread engagement between said outer member and said float are if equal pitch to enable turning of said inner member to raise and lower said float container and float together relative to said riser.

6. The ball cock assembly according to claim 5 wherein the inner member top portion extends through the valve arm.

7. The ball cock assembly according to claim 6 wherein the inner member top portion includes a slotted head for enabling manual rotation of said inner member.

8. The ball cock assembly according to claim 7 wherein said outer member includes an upper semi-sleeve having a top pivotably attached to said a m and a bottom coupled to a bottom portion of said outer member for enabling rotation of the outer member bottom portion without rotation of said semi-sleeve.

9. The ball cock assembly according to claim 8 wherein the riser includes a ridge engaged by a groove in the container for preventing rotation of the container around the riser.

10. A ball cock assembly comprising:

a water supply riser having a bottom fitting for attachment to a water inlet to a toilet tank;

a valve disposed at a top of the riser for controlling water flow into the tank, said valve including an arm extending therefrom for opening and closing said valve;

a float container disposed adjacent said riser for movement therealong;

a float disposed in said float container, for rising within said float container upon water flow into said float container;

an actuator disposed in an operative relationship with said float, float container and valve arm for operating the valve, said actuator having an outer member attached to said float for moving the valve arm and an inner member extending through an opening within said float and into an opening within said float container, with an adjustment member for operably securing said float and said float container together for adjusting a level of said float container and said float along the riser independent of movement of the valve arm by said outer member.

11. The ball cock assembly according to claim 10 wherein said inner member threadably engages said float container.

12. The ball cock assembly according to claim 11 wherein said outer member threadably engages said float.

13. The ball cock assembly according to claim 12 wherein said actuator further comprises a stabilizer having one end fixed to the riser proximate a top thereof and another end engaging an upper portion of said inner member, and said inner member comprises a shoulder for engage another end of said stabilizer and enabling rotation of said inner member.

14. The ball cock assembly according to claim 13 wherein the thread engagement between said inner member and said float container and the thread engagement between said out member and said float are if equal pitch to enable turning of said inner member to raise and lower said float container, and float together relative to said riser.

15. The ball cock assembly according to claim 14 wherein the inner member top portion extends through the valve arm.

16. The ball cock assembly according to claim 15 wherein the inner member top portion includes a slotted head for enabling manual rotation of said inner member.

17. The ball cock assembly according to claim 16 wherein said outer member includes an upper semi-sleeve having a top pivotably attached to said arm and a bottom coupled to a bottom portion of said outer member for enabling rotation of the outer member bottom portion without rotation of said semi sleeve.

18. The ball cock assembly according to claim 17 wherein the riser includes a ridge engaged by a groove in the container for preventing rotation of the container around the riser.

* * * * *